United States Patent
Kintsu et al.

(10) Patent No.: US 12,412,891 B2
(45) Date of Patent: Sep. 9, 2025

(54) NON-AQUEOUS ELECTROLYTE SECONDARY BATTERY POSITIVE ELECTRODE AND NON-AQUEOUS ELECTROLYTE SECONDARY BATTERY

(71) Applicants: Panasonic Corporation, Kadoma (JP); TOYOTA JIDOSHA KABUSHIKI KAISHA, Toyota-shi (JP)

(72) Inventors: Kohei Kintsu, Osaka (JP); Takashi Ko, Osaka (JP); Natsumi Goto, Hyogo (JP); Keiichi Takahashi, Hyogo (JP); Fumiharu Niina, Hyogo (JP); Sho Tsuruta, Osaka (JP); Ryo Hanazaki, Toyoake (JP); Akira Tsujiko, Miyoshi (JP)

(73) Assignees: PANASONIC HOLDINGS CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 84 days.

(21) Appl. No.: 17/198,878

(22) Filed: Mar. 11, 2021

(65) Prior Publication Data
US 2021/0296638 A1    Sep. 23, 2021

(30) Foreign Application Priority Data
Mar. 17, 2020    (JP) .................. 2020-046109

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/525* (2013.01); *H01M 4/625* (2013.01);
(Continued)

(58) Field of Classification Search
CPC . H01M 4/36–366; H01M 10/05–0525; H01M 2004/021–028; H01M 4/131;
(Continued)

(56) References Cited

U.S. PATENT DOCUMENTS

2020/0083524 A1* 3/2020 Baek ................. H01M 4/587
2020/0388830 A1* 12/2020 Lee .................. H01M 4/505
(Continued)

FOREIGN PATENT DOCUMENTS

JP    2006-54159 A    2/2006
JP    2013-137947 A   7/2013
(Continued)

OTHER PUBLICATIONS

Kim et al., "Three-dimensional SWCNT and MWCNT hybrid networks for extremely high-loading and high rate cathode materials," Journal of Materials Chemistry A, 2019, 7, p. 17412-17419. (Year: 2019).*
(Continued)

*Primary Examiner* — Allison Bourke
*Assistant Examiner* — Bethany C Garcia
(74) *Attorney, Agent, or Firm* — WHDA, LLP (57) ABSTRACT

Disclosed is a non-aqueous electrolyte secondary battery positive electrode that includes a positive electrode core and a positive electrode mixture layer disposed on the positive electrode core. The positive electrode mixture layer contains a positive electrode active material and carbon nanotubes. The positive electrode active material contains a lithium transition metal composite oxide (I) that either comprises secondary particles that are aggregates of primary particles having an average particle size of 1 μm or greater, or is substantially composed of single particles, the lithium transition metal composite oxide (I) having a volume-based median diameter of 0.6 μm to 6 μm, and a lithium transition
(Continued)

metal composite oxide (II) that comprises secondary particles that are aggregates of primary particles having an average particle size of less than 1 μm, the lithium transition metal composite oxide (II) having a volume-based median diameter of 3 μm to 25 μm.

11 Claims, 2 Drawing Sheets

(51) Int. Cl.
    *H01M 4/525*     (2010.01)
    *H01M 4/62*     (2006.01)
    *H01M 10/052*     (2010.01)

(52) U.S. Cl.
    CPC .... *H01M 10/052* (2013.01); *H01M 2004/021* (2013.01); *H01M 2004/028* (2013.01)

(58) Field of Classification Search
    CPC .... H01M 4/1391; H01M 4/525; H01M 4/505; H01M 4/62; H01M 4/485; H01M 4/625; H01M 4/0471; H01M 4/134; H01M 4/628; H01M 4/02; H01M 4/0404; H01M 4/043; H01M 4/0445; H01M 4/382; H01M 4/587; H01M 4/623; H01M 10/0562; H01M 2300/0068; H01M 2300/0071; H01M 2220/20; C01G 53/50; C01G 53/006; C01G 53/42; C01G 53/00; C01G 53/40; C01G 53/003; C01P 2004/61; C01P 2004/62; C01P 2004/20; C01P 2004/50; C01P 2004/60; C01P 2004/72; C01P 2004/76; C01P 2004/77; C01P 2004/85; C01P 2004/89; C01P 2004/52; C01P 2004/51; C01P 2004/54; C01P 2006/40; Y02T 10/70; Y02E 60/10; Y02P 70/50

See application file for complete search history.

(56) References Cited

U.S. PATENT DOCUMENTS

| | | | |
|---|---|---|---|
| 2021/0013508 A1* | 1/2021 | Kuroda | H01M 4/364 |
| 2022/0077450 A1* | 3/2022 | Jang | H01M 10/0525 |
| 2022/0181620 A1* | 6/2022 | Kageura | H01M 4/525 |
| 2022/0285678 A1* | 9/2022 | Takahashi | H01M 4/131 |

FOREIGN PATENT DOCUMENTS

| | | | | |
|---|---|---|---|---|
| JP | 2019-160571 A | | 9/2019 | |
| KR | 20190093453 A | * | 8/2019 | ............ H01M 4/525 |
| WO | 2019/177014 A1 | | 9/2019 | |

OTHER PUBLICATIONS

Machine Translation—KR-20190093453-A (Year: 2023).*
Office Action dated Oct. 18, 2023, issued in counterpart CN application No. 202110270598.6, with Partial English translation. (19 pages).

* cited by examiner

NON-AQUEOUS ELECTROLYTE SECONDARY BATTERY POSITIVE ELECTRODE AND NON-AQUEOUS ELECTROLYTE SECONDARY BATTERY

CROSS REFERENCE TO RELATED APPLICATION

This application claims priority to Japanese Patent Application No. 2020-046109 filed on Mar. 17, 2020, which is incorporated herein by reference in its entirety including the specification, claims, drawings, and abstract.

TECHNICAL FIELD

The present disclosure relates to a non-aqueous electrolyte secondary battery positive electrode and a non-aqueous electrolyte secondary battery.

BACKGROUND

In recent years, high Ni content lithium transition metal composite oxides have been attracting attention as high energy density positive electrode active materials. For example, JP 2006-54159 A discloses a non-aqueous electrolyte secondary battery containing a composite oxide that serves as a positive electrode active material, the composite oxide consisting of monocrystalline primary particles that are predominantly composed of Ni and Li and represented by a general formula $Li_xNi_{1-p-q-r}Co_pAl_qA_rO_{2-y}$ (where A is at least one element selected from the group consisting of Ti, V, In, Cr, Fe, Su, Cu, Zn, Mn, Mg, Ga, Ni, Co, Zr, Bi, Ge, Nb, Ta, Be, Ca, Sr, Ba, and Sc), the monocrystalline primary particles having an average particle size of 2 µm to 8 µm.

JP 2019-160571 A discloses lithium metal composite oxide powder comprising secondary particles which are aggregates of primary particles, and single particles that are present independently of the secondary particles, wherein [a/(a+b)] satisfies 0.5< [a/(a+b)]<1.0 where a represents the number of single particles and b represents the number of secondary particles. According to JP 2019-160571 A, the use of such lithium transition metal composite oxide powder reduces particle breakage that would occur due to pressing during formation of positive electrodes, and improves charge/discharge cycle characteristics.

JP 2013-137947 A discloses a positive electrode active material having particle surfaces coated with lithium metaborate and nickel oxide at a lithium metaborate coverage ratio of 85% or greater and less than 95%. According to JP 2013-137947 A, the use of such a positive electrode active material reduces side reactions between the active material and a liquid electrolyte, and improves rate characteristics.

SUMMARY

While there are demands for high Ni content lithium transition metal composite oxides that achieve a reduced capacity drop associated with charge/discharge cycles, the disclosure in JP 2019-160571 A or JP 2013-137947 A is unable to sufficiently reduce a capacity drop associated with charge/discharge cycles.

The present disclosure is directed toward a reduced capacity drop associated with charge/discharge cycles in a non-aqueous electrolyte secondary battery using a non-aqueous electrolyte secondary battery positive electrode containing a high Ni content lithium transition metal composite oxide.

According to an aspect of the present disclosure, there is provided a non-aqueous electrolyte secondary battery positive electrode comprising a positive electrode core and a positive electrode mixture layer disposed on the positive electrode core. The positive electrode mixture layer contains a positive electrode active material and carbon nanotubes. The positive electrode active material contains a lithium transition metal composite oxide (I) that either comprises secondary particles that are aggregates of primary particles having an average particle size of 1 µm or greater, or is substantially composed of single particles, the lithium transition metal composite oxide (I) having a volume-based median diameter (D50) of 0.6 µm to 6 µm, and a lithium transition metal composite oxide (II) that comprises secondary particles that are aggregates of primary particles having an average particle size of less than 1 µm, the lithium transition metal composite oxide (II) having a volume-based median diameter (D50) of 3 µm to 25 µm. Each of the lithium transition metal composite oxides (I) and (II) contains Ni in an amount of 80 mol % or more relative to the total number of moles of one or more metal elements excluding Li, and one or more elements selected from group 4 elements, group 5 elements, group 6 elements, and group 13 elements of the periodic table are present on particle surfaces of each of the lithium transition metal composite oxides (I) and (II).

According to another aspect of the present disclosure, there is provided a non-aqueous electrolyte secondary battery comprising a positive electrode, a negative electrode, and a non-aqueous electrolyte, wherein the positive electrode is the above-described non-aqueous electrolyte secondary battery positive electrode.

By using a non-aqueous electrolyte secondary battery positive electrode according to the present disclosure, a capacity drop associated with charge/discharge cycles in a non-aqueous electrolyte secondary battery can be reduced.

BRIEF DESCRIPTION OF DRAWINGS

Embodiments of the present disclosure will be described based on the following figures, wherein.

DESCRIPTION OF EMBODIMENTS

An example embodiment of a non-aqueous electrolyte secondary battery according to the present disclosure will be described in detail below. Although the following description describes, by way of example, a cylindrical battery in which a wound electrode assembly is housed in an exterior can that has a cylindrical shape with a closed bottom, the exterior structure is not limited to a cylindrical exterior can. For example, the exterior structure may be a rectangular exterior can or may be composed of a laminate sheet including a metal layer and a resin layer. The electrode assembly may be a laminated electrode assembly that includes a plurality of positive electrodes and a plurality of negative electrodes alternately laminated with a separator therebetween.

Figure 1:
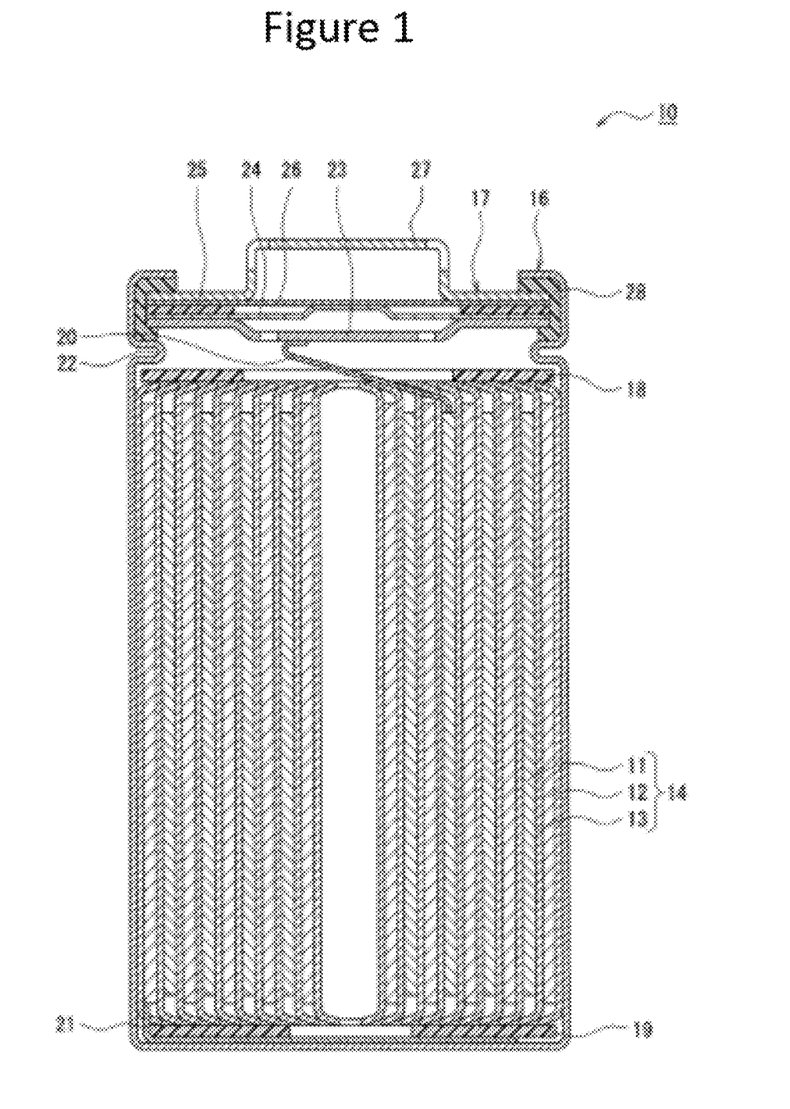
FIG. 1 is a cross-sectional view of a non-aqueous electrolyte secondary battery according to an example embodiment.

FIG. 1 is a cross-sectional view of a non-aqueous electrolyte secondary battery 10 according to an example embodiment. As illustrated in FIG. 1, the non-aqueous electrolyte secondary battery 10 includes a wound electrode assembly 14, a non-aqueous electrolyte, and an exterior can 16 that receives the electrode assembly 14 and the electrolyte. The electrode assembly 14 includes a positive electrode 11, a negative electrode 12, and a separator 13, and has a wound configuration in which the positive electrode 11 and the negative electrode 12 are spirally wound with the separator 13 therebetween. The exterior can 16 is a metal container having a cylindrical shape with a closed bottom, which is open on one side in an axial direction, the opening of the exterior can 16 being closed by a sealing structure 17. In following description, for case of description, the term "upper" refers to the side toward the sealing structure 17 of the battery, and the term "lower" refers to the side toward the bottom of the exterior can 16.

The non-aqueous electrolyte includes a non-aqueous solvent and an electrolyte salt dissolved in the non-aqueous solvent. Examples of the non-aqueous solvent include esters, ethers, nitriles, amides, and mixture solvents of two or more thereof. The non-aqueous solvent may contain a halogen substitution product of these solvents in which hydrogens of the solvents are, at least in part, substituted with a halogen atom such as fluorine. Examples of the electrolyte salt include a lithium salt such as $LiPF_6$. The electrolyte is not limited to a liquid electrolyte and may be a solid electrolyte containing, for example, a gel polymer.

The positive electrode 11, the negative electrode 12, and the separator 13 of the electrode assembly 14 are long strips of material that are laminated alternately in the radial direction of the electrode assembly 14 as they are spirally wound. In an embodiment, to prevent precipitation of lithium, the negative electrode 12 has a size slightly larger than the positive electrode 11. More specifically, in an embodiment, the negative electrode 12 has longer lengths than the positive electrode 11 both in the length direction and in the width direction (shorter length direction). For example, the separator 13 has a size slightly larger than at least the positive electrode 11 and is disposed so that the positive electrode 11 is interposed between two separators 13. The electrode assembly 14 includes a positive electrode lead 20 that is connected to the positive electrode 11 by, for example, welding, and a negative electrode lead 21 that is connected to the negative electrode 12 by, for example, welding.

Insulating plates 18 and 19 are respectively disposed on upper and lower sides of the electrode assembly 14. In the example illustrated in FIG. 1, the positive electrode lead 20 passes through a through hole in the insulating plate 18 and extends toward the sealing structure 17, and the negative electrode lead 21 passes outside the insulating plate 19 and extends toward the bottom of the exterior can 16. The positive electrode lead 20 is connected to an underside of an internal terminal plate 23 of the sealing structure 17 by, for example, welding, and a cap 27 that is the top plate of the sealing structure 17 electrically connected to the internal terminal plate 23 serves as a positive electrode terminal. The negative electrode lead 21 is connected to an inner surface of the bottom of the exterior can 16 by, for example, welding, and the exterior can 16 serves as a negative electrode terminal.

A gasket 28 is provided between the exterior can 16 and the sealing structure 17, thereby maintaining airtightness of the space inside the battery. The exterior can 16 has a groove or inward projection 22, which is an inwardly protruding portion of the side surface of the exterior can 16, and the groove or inward projection 22 supports the sealing structure 17. In an embodiment, the groove or inward projection 22 has an annular shape extending along the circumference of the exterior can 16, and supports the sealing structure 17 on its upper surface. The sealing structure 17 is fixed to an upper portion of the exterior can 16 via the groove or inward projection 22 and an opening edge portion of the exterior can 16 that is swaged to the sealing structure 17.

The sealing structure 17 has a configuration in which the infernal terminal plate 23, a lower valve element 24, an insulating member 25, an upper valve element 26, and the cap 27 are stacked in that order from the side on which the electrode assembly 14 is located. The components of the sealing structure 17 have, for example, either a disc shape or a ring shape and are, except for the insulating member 25, electrically connected to each other. The lower valve element 24 and the upper valve element 26 are connected to each other at their center portions, and the insulating member 25 is interposed between their peripheral portions. In response to an increase in internal pressure of the battery due to abnormal heat generation, the lower valve element 24 breaks as it is deformed so as to push the upper valve element 26 toward the cap 27, resulting in an interruption of the current path between the lower valve element 24 and the upper valve element 26. In response to a further increase in internal pressure, the upper valve element 26 breaks, letting gas escape through an opening of the cap 27.

The positive electrode 11, the negative electrode 12, and the separator 13 of the electrode assembly 14 will be described below.

Positive Electrode

Figure 2:
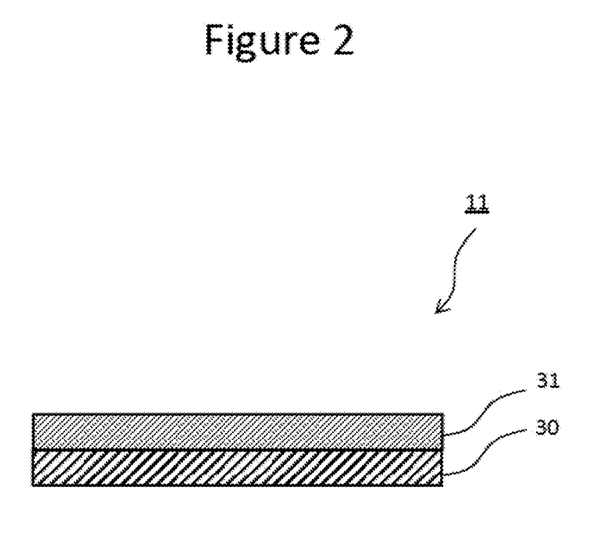
FIG. 2 is a schematic cross-sectional view of an example positive electrode for use in the non-aqueous electrolyte secondary battery according to the embodiment.

FIG. 2 is a schematic cross-sectional view of an example positive electrode for use in the non-aqueous electrolyte secondary battery according to the embodiment. As illustrated in FIG. 2, the positive electrode 11 includes a positive electrode core 30 and a positive electrode mixture layer 31 that is disposed on the positive electrode core 30. Examples of the positive electrode core 30 include foil of metal that is stable in a potential range of the positive electrode 11, such as aluminum, and a film having such metal disposed in its surface layer. The positive electrode mixture layer 31 contains, for example, a positive electrode active material, a binder, and a conductive material. The positive electrode mixture layer 31 may be provided on one side of the positive electrode core 30, as illustrated in FIG. 2, and in another embodiment, may be provided on both sides of the positive electrode core 30. The positive electrode 11 can be prepared by, for example, applying positive electrode mixture slurry containing, for example, a positive electrode active material, a binder, and a conductive material, to surfaces of the positive electrode core 30, drying the coating, and then rolling it to form the positive electrode mixture layer 31 on both sides of the positive electrode core 30.

Examples of the conductive material contained in the positive electrode mixture layer 31 include carbon nanotubes. It is believed that a positive electrode mixture layer 31 that contains carbon nanotubes will maintain electrical conductivity between particles of the positive electrode active material and reduces a battery capacity drop in charge/discharge cycles even when the positive electrode active material contains high Ni content lithium transition metal composite oxides (I) and (II), which will be described later. When carbon nanotubes are used as the conductive material, as electrical conductivity between particles of the positive electrode active material is maintained even when a reduced amount of the conductive material is added, the loading amount of the positive electrode active material can be increased, and energy density of the battery can be enhanced compared to when the conductive material is in the form of particles of, for example, acetylene black.

Examples of the carbon nanotubes include single-walled carbon nanotubes and multi-walled carbon nanotubes. A single-walled carbon nanotube (SWCNT) is a carbon nanostructure in which a single graphene sheet forms a single tubular shape. A multi-walled carbon nanotube is a carbon nanostructure in which a plurality of concentrically nested graphene sheets form a single tubular shape. The term "graphene sheet" refers to a sheet in which sp2 hybridized orbital carbon atoms that form graphite crystals are located at the vertices of regular hexagons. The carbon nanotubes may be in any shape. Examples of the shape include various different shapes such as a needle-like shape, a cylindrical tubular shape, a fishbone-like shape (or a cup stacked shape), a platelet shape, and a coiled shape.

The positive electrode mixture layer 31 may contain only either single-walled carbon nanotubes or multi-walled carbon nanotubes and, in order to enhance electrical conductivity between particles of the positive electrode active material and further reduce a capacity drop in charge/discharge cycles, may contain both single-walled carbon nanotubes and multi-walled carbon nanotubes. It is believed that as single-walled carbon nanotubes typically have longer fiber lengths than multi-walled carbon nanotubes, the positive electrode mixture layer 31 that contains single-walled carbon nanotubes easily maintains conduction paths between particles of the positive electrode active material. It is further believed that as single-walled carbon nanotubes typically have smaller fiber diameters and are therefore more flexible than multi-walled carbon nanotubes, a positive electrode mixture layer 31 that contains single-walled carbon nanotubes can follow expansion and shrinkage of the active material associated with charge/discharge cycles to keep active material particles in contact with each other. It is also believed that a positive electrode mixture layer 31 that contains multi-walled carbon nanotubes, which typically have shorter fiber lengths than single-walled carbon nanotubes, easily forms many points of contact between multi-walled carbon nanotubes and particles of the positive electrode active material. It is further believed that a positive electrode mixture layer 31 that contains multi-walled carbon nanotubes, which typically have larger fiber diameters than single-walled carbon nanotubes, easily forms large areas of contact between multi-walled carbon nanotubes and particles of the positive electrode active material. It is therefore believed that, compared to a positive electrode mixture layer 31 that contains either only single-walled carbon nanotubes or only multi-walled carbon nanotubes, a positive electrode mixture layer 31 that contains both single-walled carbon nanotubes and multi-walled carbon nanotubes can enhance electrical conductivity between particles of the positive electrode active material and further reduce a battery capacity drop in charge/discharge cycles.

Single-walled carbon nanotubes have a fiber length of, for example, 10 μm to 50 μm, and multi-walled carbon nanotubes have a fiber length of, for example, 1 μm to 20 μm. The fiber length of carbon nanotubes can be determined by measuring lengths of 50 randomly chosen carbon nanotubes using a field emission scanning electron microscope (FE-SEM) and arithmetically averaging the measured values.

Single-walled carbon nanotubes have a fiber diameter of, for example, 1 nm to 5 mm, and multi-walled carbon nanotubes have a fiber diameter of, for example, 5 nm to 30 nm. The fiber diameter of carbon nanotubes can be determined by measuring outer diameters of 50 randomly chosen carbon nanotubes using a field emission scanning electron microscope (FE-SEM) or a transmission electron microscope (TEM) and arithmetically averaging the measured values.

In an embodiment, the ratio of the mass of single-walled carbon nanotubes to the mass of the positive electrode mixture layer 31 is less than the ratio of the mass of multi-walled carbon nanotubes to the mass of the positive electrode mixture layer 31. That is, in an embodiment, the positive electrode mixture layer 31 contains single-walled carbon nanotubes in a smaller amount by mass than multi-walled carbon nanotubes (in other words, in an embodiment, the positive electrode mixture layer 31 contains multi-walled carbon nanotubes in a larger amount than single-walled carbon nanotubes). This may further reduce a battery capacity drop in charge/discharge cycles.

Although the positive electrode mixture layer 31 may contain particulate conductive material, in an embodiment, the positive electrode mixture layer 31 is free of particulate conductive material. The positive electrode mixture layer 31 that is free of particulate conductive material may enhance energy density of the battery, as the loading amount of the positive electrode active material is increased. Examples of the particulate conductive material include carbon materials such as carbon black, acetylene black, Ketjen black, and graphite. When the positive electrode mixture layer 31 contains particulate conductive material, in an embodiment, its primary particles have a diameter of 5 nm to 100 mm, and in an embodiment, the aspect ratio is less than 10.

Examples of the binder contained in the positive electrode mixture layer 31 include polytetrafluoroethylene (PTFE), polyvinylidene fluoride (PVdF), and other fluorocarbon resins, polyacrylonitrile (PAN), polyimides, acrylic resins, and polyolefins. One or more of these resins may be used in combination with, for example, a cellulose derivative such as carboxymethylcellulose (CMC) or a salt thereof, or polyethylene oxide (PEO).

The positive electrode active material contained in the positive electrode mixture layer 31 includes a lithium transition metal composite oxide (I) having a volume-based median diameter (D50) of 0.6 μm to 6 μm and a lithium transition metal composite oxide (II) having a volume-based median diameter (D50) of 3 μm to 25 μm (hereinafter simply referred to as "composite oxide (I)" and "composite oxide (II)", respectively). The positive electrode active material may contain only the composite oxides (I) and (II), but may also contain other composite oxides besides the composite oxides (I) and (II), or other compounds, without deviating from the intent of the present disclosure.

The term "volume-based median diameter (D50)" represents the particle diameter below which 50% of the frequency cumulative total lies in a volume-based particle size distribution. The composite oxide particle size and particle size distribution can be measured using a laser diffraction particle size distribution measurement device (for example, MT3000II manufactured by MicrotracBEL Corporation) using water as the dispersion medium.

The composite oxide (I) comprises either secondary particles that are aggregates of large primary particles having an average particle size of 1 μm or greater, or composite oxide particles that are substantially composed of single particles. The composite oxide (I) substantially composed of single particles represents particles in which grain boundaries of primary particles cannot be confirmed when observed at an appropriate magnification using a scanning electron microscope (SEM). In the composite oxide (I) that comprises secondary particles, the primary particles have an average particle size of, for example, 1 μm to 6 μm. On the other hand, the composite oxide (II) comprises secondary particles that are aggregates of small primary particles having an average particle size of less than 1 μm.

In the composite oxide (I) that comprises secondary particles, grain boundaries of primary particles are confirmed in particle cross sections as observed using an SEM. A secondary particle of the composite oxide (I) is composed of, for example, 100 or less primary particles, in another embodiment, a few to tens of primary particles, and in still another embodiment, two to five primary particles. A secondary particle of the composite oxide (II) is composed of, for example, 10,000 to 5,000,000 primary particles. As the particle diameter of a primary particle, the Feret diameter of an area enclosed by its grain boundary (primary particle) is measured in an SEM image of a composite oxide particle cross section. The average particle size of primary particles is determined by averaging particle diameters of 100 primary particles.

The composite oxide (I) contains Ni in an amount of 80 mol % or more relative to the total number of moles of one or more metal elements excluding Li. One or more elements selected from group 4 elements, group 5 elements, group 6 elements, and group 13 elements of the periodic table are present on particle surfaces of the composite oxide (I). Similarly, the composite oxide (II) contains Ni in an amount of 80 mol % or more relative to the total number of moles of one or more metal elements excluding Li, and one or more elements selected from group 4 elements, group 5 elements, group 6 elements, and group 13 elements of the periodic table are present on particle surfaces of the composite oxide (II). These elements that may be present on particle surfaces are in the form of, for example, metals, alloys, or compounds such as oxides. The term "particle surface" refers to surfaces of primary particles or surfaces of secondary particles. Some atoms of the one or more elements selected from group 4 elements, group 5 elements, group 6 elements, and group 13 elements of the periodic table may be present inside the primary particles of the composite oxides and may form a solid solution together with one or more other metal elements contained in the composite oxides.

Examples of the group 4 elements include Ti (titanium), Zr (zirconium), and Hf (hafnium). Examples of the group 5 elements include V (vanadium), Nb (niobium), and Ta (tantalum). Examples of the group 6 elements include Cr (chromium), Mo (molybdenum), and W (tungsten). Examples of the group 13 elements include B (boron), Al (aluminum), Ga (gallium), In (indium), and Tl (thallium).

The use of the composite oxides (I) and (II) having the above-described particle sizes and particle forms as the positive electrode active material reduces particle breakage of the positive electrode active material that would occur, for example, when rolled during preparation of the positive electrode 11. The presence of one or more of the above-described elements on particle surfaces of the composite oxides (I) and (II) reduces side reactions with, for example, a non-aqueous electrolyte and reduces particle breakage of the positive electrode active material. It is believed that such a reduction in particle breakage contributes to a reduced battery capacity drop in charge/discharge cycles. It is therefore believed that, because of the synergy between the reduction in particle breakage of the positive electrode active material achieved by using the composite oxides (I) and (II) having the above-described particle sizes and particle forms and the maintenance of electrical conductivity between particles of the positive electrode active material achieved by using carbon nanotubes as described above, a battery capacity drop in charge/discharge cycles can be reduced even when high Ni content lithium transition metal composite oxides are used.

In an embodiment, in order to achieve, for example, an increased energy density of the battery and a reduced battery capacity drop in charge/discharge cycles, the composite oxide (I) is a composite oxide represented by a general formula $Li_aNi_bCo_cM1_dM2_eO_f$ (where $0.8 \leq a \leq 1.2$, $b \geq 0.80$, $c \leq 0.15$, $0.01 \leq d \leq 0.12$, $0.001 \leq e \leq 0.06$, $1 \leq f \leq 2$, $b+c+d+e=1$, M1 represents one or more elements selected from Mn and Al, and M2 represents one or more elements selected from group 4 elements, group 5 elements, group 6 elements, and group 13 elements of the periodic table). More specifically, in an embodiment, M2 in the general formula above represents one or more elements selected from B and Al. Molar fractions of metal elements in all composite oxide particles are measured by inductively coupled plasma (ICP) emission spectroscopy analysis.

The composite oxide (I) can be prepared by, for example, the following process.

A lithium compound such as lithium hydroxide serving as a Li source and a nickel-containing compound serving as a Ni source are mixed at a mixing ratio determined based on the intended composite oxide (I), a potassium compound or a sodium compound is added to this mixture, and the resulting mixture is calcined in air or in a stream of oxygen (step 1). The nickel-containing compound may also contain another additive element such as Mn or Al. The resulting calcined product is then washed with water to remove the potassium compound or the sodium compound adhering to surfaces of the calcined product, a compound containing one or more elements selected from group 4 elements, group 5 elements, group 6 elements, and group 13 elements of the periodic table is added to the resulting lithium nickel containing composite oxide to form composites with one or more elements selected from group 4 elements, group 5 elements, group 6 elements, and group 13 elements of the periodic table on particle surfaces, followed by calcination (step 2). Composite formation is performed using, for example, a dry particle composite forming apparatus (for example, NOB-130 manufactured by Hosokawa Micron Corporation). For composite formation, a lithium source such as lithium hydroxide may be added.

The above-described method synthesizes the composite oxide (I) in which one or more elements selected from group 4 elements, group 5 elements, group 6 elements, and group 13 elements of the periodic table are present on particle surfaces. Although a specific theory as to why primary particles will have large particle size is unclear, it is believed that this is because the growth of monocrystalline particles during calcination proceeds uniformly throughout the entire mixture phase when a potassium compound or a sodium compound is added to the above-described mixture.

The calcination temperature in step 1 is, for example, 600° C. to 1,050° C., and primary particles tend to be larger, the higher the temperature. The calcination time in step 1 is, for example, about one hour to about 100 hours. Examples of the potassium compound include potassium hydroxide (KOH) and salts thereof, and potassium acetate. Examples of the sodium compound include sodium hydroxide and salts thereof. The potassium compound or the sodium compound is added in an amount of, for example, 0.1% to 100% by mass relative to the composite oxide (I) that is to be synthesized.

The calcination temperature in step 2 is, for example, 200° C. to 500° C., and, the lower the temperature, the greater an amount of one or more elements selected from group 4 elements, group 5 elements, group 6 elements, and group 13 elements of the periodic table that can be present on particle surfaces. The calcination time in step 2 is, for example, about one hour to about 100 hours.

In an embodiment, in order to achieve, for example, an increased energy density of the battery and a reduced battery capacity drop in charge/discharge cycles, an example of the composite oxide (II) is a composite oxide represented by a general formula $Li_aNi_bCo_cM1_dM2_eO_f$ (where $0.8 \le a \le 1.2$, $b \ge 0.80$, $c \le 0.15$, $0.01 \le d \le 0.12$, $0.001 \le e \le 0.06$, $1 \le f \le 2$, b+c+d+e=1, M1 represents one or more elements selected from Mn and Al, and M2 represents one or more elements selected from group 4 elements, group 5 elements, group 6 elements, and group 13 elements of the periodic table). More specifically, in an embodiment, M2 in the general formula above represents one or more elements selected from B and Ti.

The composite oxide (II) can be prepared with the following process, for example.

A lithium compound such as lithium hydroxide serving as a Li source and a nickel-containing compound serving as a Ni source are mixed at a mixing ratio determined based on the intended composite oxide (II), and the resulting mixture is calcined in air or in a stream of oxygen (step 1). The nickel-containing compound may also contain another additive element such as Mn or Al. A compound containing one or more elements selected from group 4 elements, group 5 elements, group 6 elements, and group 13 elements of the periodic table is added to the resulting calcined product (lithium nickel containing composite oxide) to form composites with one or more elements selected from group 4 elements, group elements, group 6 elements, and group 13 elements of the periodic table on particle surfaces, followed by calcination (step 2). For composite formation, a lithium source such as lithium hydroxide may be added.

The above-described method synthesizes the composite oxide (II) in which one or more elements selected from group 4 elements, group 5 elements, group 6 elements, and group 13 elements of the periodic table are present on particle surfaces. The calcination time and the calcination temperature in step 1 and in step 2 are similar to those for the synthesis of the composite oxide (I).

In an embodiment, in order to achieve, for example, a reduced battery capacity drop in charge/discharge cycles, the composite oxide (II) comprises B as M2 in the general formula above, and, when it is assumed that particles having particle diameters that are larger than a volume-based 70% particle diameter (D70) are first particles and that particles having particle diameters that are smaller than a volume-based 30% particle diameter (D30) are second particles, a molar fraction of B in the first particles (B1) relative to the total number of moles of one or more metal elements excluding Li is greater than a molar fraction of B in the second particles (B2) relative to the total number of moles of one or more metal elements excluding Li. Typically, B in the composite oxide (II) is present on particle surfaces in the form of a B-containing compound. The boron compound may contain Li.

The term "D70" as used herein represents the particle diameter below which 70% of the frequency cumulative total lies in a volume-based particle size distribution. Similarly, the term "D30" as used herein represents the particle diameter below which 30% of the frequency cumulative total lies in a volume-based particle size distribution. For example, D70 is 9 μm to 19 μm, and D30 is 3 μm n to 13 μm.

The ratio (B1/B2) of the molar fraction of boron contained in the first particles (B1) to the molar fraction of boron contained in the second particles (B2) may be 1.1 or greater, may be 1.5 or greater, and may be 3.0 or greater. The upper limit of the ratio (B1/B2) is not particularly limited and is, for example, 10. The ratio (B1/B2) ranges, for example, from 1.5 to 3.5 or from 2.5 to 3.5.

An example of a method of producing the composite oxide (II) in which the molar fraction of B in the first particles (B1) relative to the total number of moles of one or more metal elements excluding Li is greater than the molar fraction of B in the second particles (B2) relative to the total number of moles of one or more metal elements excluding Li will be described below.

A lithium compound such as lithium hydroxide is added and mixed to two different nickel-containing compounds (X1) and (X2) having different D50 values, and the resulting mixtures are calcined to synthesize lithium nickel composite oxides (Y1) and (Y2) having different D50 values (step 1). The nickel-containing compounds may also contain another additive element such as Mn or Al.

The resulting lithium nickel composite oxides (Y1) and (Y2) may be washed with water.

Subsequently, a boron source is added to the lithium nickel composite oxides (Y1) and (Y2) to form composites with boron on particle surfaces, followed by calcination to synthesize lithium transition metal composite oxides (Z1) and (Z2) (step 2). The composite oxides (Z1) and (Z2) are then mixed together to obtain the composite oxide (II). An example of the boron source is boric acid ($H_3BO_3$). For composite formation, a lithium source such as lithium hydroxide may be added.

By adjusting the amount of $H_3BO_3$ added to the lithium nickel composite oxide (Y1) to be greater than the amount of $H_3BO_3$ added to the lithium nickel composite oxide (Y2) in step 2 above, the molar fraction of boron (B1) on surfaces of the first particles of the composite oxide (II) is made to be greater than the molar fraction of boron (B2) on surfaces of the second particles of the composite oxide (II); that is, B1>B2. The calcination temperature in step 2 above is, for example, 200° C. to 500° C.

By selecting whether or not to wash the composite oxides (Y1) and (Y2) with water and adjusting the calcination temperature, the coverage ratios of the boron compounds on surfaces of the first particles and the second particles of the composite oxide (II) can be adjusted. By calcining the composite oxides (Y1) and (Y2) that have been washed with water at a high temperature together with the boron source, composite oxides having small boron compound surface coverage ratios can be synthesized. The term "high temperature" as used herein represents, for example, 350° C. to 500° C.

The percentage content of the composite oxide (I) relative to the mass of the positive electrode active material is, for example, 5% to 65% by mass, 10% to 60% by mass in another embodiment, and 20% to 55% by mass in still another embodiment. The percentage content of the composite oxide (II) relative to the mass of the positive electrode active material is, for example, 35% to 95% by mass, 40% to 90% by mass in another embodiment, and 45% to 80% by mass in still another embodiment.

In order to achieve, for example, a reduced battery capacity drop in charge/discharge cycles, the positive electrode mixture layer 31 has a resistance value of 15 $\Omega cm^2$ or less in an embodiment, and a resistance value of 10 $\Omega cm^2$ or less in another embodiment. For example, the positive electrode mixture layer 31 that contains carbon nanotubes can achieve a reduced resistance value of the positive electrode mixture layer 31. The resistance value of the positive electrode mixture layer 31 can be measured using an electrode resistance measurement system, RM2610 manufactured by Hioki E.E. Corporation.

In order to achieve, for example, an increased energy density of the battery, the positive electrode mixture layer 31 has a density of 3.55 g/cc or greater in an embodiment, and a density of 3.60 g/cc or greater in another embodiment. For example, by adjusting the percentage content of each of the composite oxides (I) and (II) to fall in the above-described ranges, an increased loading density of the positive electrode mixture layer 31 can be achieved.

Negative Electrode

The negative electrode 12 includes a negative electrode core and a negative electrode mixture layer that is disposed on the surface of the negative electrode core. Examples of the negative electrode core include foil of metal that is stable in a potential range of the negative electrode 12, such as copper, and a film having such metal disposed in its surface layer. The negative electrode mixture layer contains a negative electrode active material and a binder and in an embodiment, is, for example, provided on both sides of the negative electrode core except at the portion where the negative electrode lead 21 is connected. The negative electrode 12 can be prepared by, for example, applying negative electrode mixture slurry containing, for example, a negative electrode active material and a binder to surfaces of the negative electrode core, drying the coating, and then rolling it to form the negative electrode mixture layer on both sides of the negative electrode core.

As the negative electrode active material, the negative electrode mixture layer contains, for example, a carbon-based active material that reversibly occludes and releases lithium ions. The carbon-based active material is, for example, graphite including natural graphite such as flake graphite, massive graphite, and earthy graphite, and artificial graphite such as massive artificial graphite (MAG) and graphitized mesophase carbon microbeads (MCMB). As the negative electrode active material, a Si-based active material that is composed of at least one of Si and a Si-containing compound may be used, and a carbon-based active material and a Si-based active material may be used in combination.

Similar to the positive electrode 11, examples of the binder contained in the negative electrode mixture layer include fluorocarbon resins, PAN, polyimides, acrylic resins, and polyolefins, and in an embodiment, styrene-butadiene rubber (SBR) is used. The negative electrode mixture layer may further contain, for example, CMC or a salt thereof, polyacrylic acid (PAA) or a salt thereof, or polyvinyl alcohol (PVA). In an embodiment, SBR may be used in combination with CMC or a salt thereof or PAA or a salt thereof.

Separator

For example, a porous sheet having ion permeability and insulating properties is used as the separator 13. Specific examples of the porous sheet include a microporous thin film, woven fabric, and nonwoven fabric. Examples of the material for the separator 13 include polyethylene, polypropylene, and other polyolefins and cellulose. The separator 13 may have either a single-layer structure or a multi-layer structure. The separator may have, for example, a heat-resistant layer on its surface.

EXAMPLES

The present disclosure will be further described below with reference to examples, but the present disclosure is not limited to these examples.

Example 1

Preparation of Composite Oxide (I)

A nickel cobalt manganese composite hydroxide having a composition of $Ni_{0.82}Co_{0.10}Mn_{0.08}(OH)_2$ obtained by coprecipitation was calcined at 500° C. to obtain a nickel cobalt manganese composite oxide. Subsequently, lithium hydroxide and the prepared nickel cobalt manganese composite oxide were mixed in a 1.05:1 molar ratio of Li to the total amount of Ni, Co, and Mn, and a potassium compound was further added to this mixture in an amount of 20% by mass relative to the composite oxide. The resulting mixture was calcined for 72 hours at 750° C. in an oxygen atmosphere, and then ground and washed with water to remove the potassium compound to obtain a composite oxide. This composite oxide and a boron compound were dry mixed in a 100:1.0 molar ratio of the total amount of Ni, Co, and Mn to B in the boron compound to form composites with B on particle surfaces, and then the resulting mixture was calcined for 8 hours at 300° C. in an oxygen atmosphere. This calcined product was ground to obtain a composite oxide (I) in which B was present on particle surfaces.

The composition of the composite oxide (I) as measured by ICP analysis was $Li_{1.01}Ni_{0.81}Co_{0.10}Mn_{0.08}B_{0.01}O_2$. The D50 value of the composite oxide (I) was 4 μm. The average particle size of primary particles of the composite oxide (I) as determined through SEM observation of a cross section of the composite oxide (I) prepared by cross-section polishing (CP) was 2 jun. About 50% or greater of all particles of the composite oxide (I) were in the form of single particles, and some particles were in the form of pseudo-aggregates each including three to a dozen or so primary particles bonded together.

Preparation of Composite Oxide (II)

A nickel cobalt manganese composite hydroxide having a composition of $Ni_{0.85}Co_{0.08}Mn_{0.07}(OH)_2$ obtained by coprecipitation was calcined at 500° C. to obtain a nickel cobalt manganese composite oxide. Subsequently, lithium hydroxide and the prepared nickel cobalt manganese composite oxide were mixed in a 1.08:1 molar ratio of Li to the total amount of Ni, Co, and Mn. The resulting mixture was calcined for 8 hours at 700° C. in an oxygen atmosphere, and then ground to obtain a composite oxide. This composite oxide, a boron compound, and a titanium compound were dry mixed in a 100:1:2 molar ratio of the total amount of Ni, Co, and Mn to B in the boron compound to Ti in the titanium compound, to form composites with B and Ti on particle surfaces, and then the resulting mixture was calcined for 8 hours at 300° C. in an oxygen atmosphere. This calcined product was ground to obtain a composite oxide (II) in which B and Ti were present on particle surfaces.

The composition of the composite oxide (II) as measured by ICP analysis was $Li_{1.01}Ni_{0.83}Co_{0.08}Mn_{0.07}B_{0.01}Ti_{0.02}O_2$. The D50 value of the composite oxide (II) was 11 μm. The average particle size of primary particles of the composite oxide (II) as determined through SEM observation of a cross section of the composite oxide (II) prepared by CP was 0.5 μm.

A positive electrode active material was prepared by mixing the composite oxide (I) with the composite oxide (II) in an amount of 50% by mass relative to the total mass of the positive electrode active material.

Preparation of Positive Electrode

The above-described positive electrode active material, single-walled carbon nanotubes (SWCNT), multi-walled carbon nanotubes (MWCNT), and polyvinylidene fluoride (PVdF) were mixed in a solid content mass ratio of 98.76: 0.04:0.2:1.0, an appropriate amount of N-methyl-2-pyrrolidone (NMP) was added to this mixture, and then the resulting mixture was kneaded to prepare positive electrode mixture slurry. This positive electrode mixture slurry was applied to both sides of a positive electrode core consisting of aluminum foil, and the coating was dried, then rolled using a roller, and cut into pieces of a predetermined electrode size to obtain a positive electrode having a positive electrode mixture layer on both sides of the positive electrode core. A portion of the positive electrode was an exposed portion where a surface of the positive electrode core was exposed.

Preparation of Negative Electrode

Natural graphite was used as the negative electrode active material. The negative electrode active material, sodium carboxymethylcellulose (CMC-Na), and styrene-butadiene rubber (SBR) were mixed in a solid content mass ratio of 100:1:1 in an aqueous solution to prepare negative electrode mixture slurry. This negative electrode mixture slurry was applied to both sides of a negative electrode core consisting of copper foil, and the coating was dried, then rolled using a roller, and cut into pieces of a predetermined electrode size to obtain a negative electrode having a negative electrode mixture layer on both sides of the negative electrode core. A portion of the negative electrode was an exposed portion where a surface of the negative electrode core was exposed.

Formulation of Non-Aqueous Electrolyte

Ethylene carbonate (EC), ethylmethyl carbonate (EMC), and dimethyl carbonate (DMC) were mixed in a volume ratio of 3:3:4, and lithium hexafluorophosphate (LiPF$_6$) was dissolved in the resulting mixture solvent in a concentration of 1.0 mole/liter. Vinylene carbonate (VC) was further dissolved in this mixture solvent in a concentration of 2.0% by mass to prepare a non-aqueous liquid electrolyte.

Preparation of Battery

An aluminum lead was attached to the exposed portion of the above-described positive electrode, a nickel lead was attached to the exposed portion of the above-described negative electrode, and the positive electrode and the negative electrode were spirally wound with a polyolefin separator therebetween and then pressed in the radial direction to prepare a flat wound electrode assembly. This electrode assembly was placed in an exterior structure composed of an aluminum laminate sheet, the inside of the exterior structure was filled with the above-described non-aqueous liquid electrolyte, and then the opening of the exterior structure was sealed to obtain a non-aqueous electrolyte secondary battery.

Example 2

Preparation of Composite Oxide B

A nickel cobalt manganese composite hydroxide having a composition of $Ni_{0.85}Co_{0.08}Mn_{0.07}(OH)_2$ obtained by coprecipitation was calcined at 500° C. and then screened using a vibrating screen (a screen aperture size of 300 μm and a vibration time of 30 minutes) to obtain a nickel cobalt manganese composite oxide (X1) having a D50 of 14 μm that the screen retained and a nickel cobalt manganese composite oxide (X2) having a D50 of 7 μm that had passed through the screen.

Subsequently, lithium hydroxide and the nickel cobalt manganese composite oxide (X1) were mixed together in a 1.08:1 molar ratio of Li to the total amount of Ni, Co, and Mn. The resulting mixture was calcined for 8 hours at 700° C. in an oxygen atmosphere, and then ground to obtain a lithium composite oxide (Y1).

Lithium hydroxide and the nickel cobalt manganese composite oxide (X2) were mixed together in a 1.08:1 molar ratio of Li to the total amount of Ni, Co, and Mn. The resulting mixture was calcined for 8 hours at 700° C. in an oxygen atmosphere, and then ground to obtain a lithium composite oxide (Y2).

Subsequently, the lithium composite oxide (Y1), a boron compound, and a titanium compound were dry mixed in a 100:1.5:3 molar ratio of the total amount of Ni, Co, and Mn to B in the boron compound to Ti in the titanium compound to form composites with B and Ti on particle surfaces. The resulting mixture was calcined for 8 hours at 300° C. in an oxygen atmosphere, and then ground to obtain a lithium composite oxide (Z1) in which B and Ti were present on particle surfaces.

The lithium composite oxide (Y2), a boron compound, and a titanium compound were dry mixed in a 100:0.5:1 molar ratio of the total amount of Ni, Co, and Mn to B in the boron compound to Ti in the titanium compound to form composites with B and Ti on particle surfaces. The resulting mixture was calcined for 8 hours at 300° C. in an oxygen atmosphere, and then ground to obtain a lithium composite oxide (Z2) in which B and Ti were present on particle surfaces. The lithium composite oxides (Z1) and (Z2) were then mixed in a mass ratio of 1:1 to obtain a composite oxide (II).

In the composite oxide (II), the molar fraction of boron (B1) in first particles having particle diameters that were larger than a volume-based D70 was 0.015, and the molar fraction of boron (B2) on surfaces of second particles having particle diameters that were smaller than a volume-based D30 was 0.005, that is, the ratio (B1/B2) was 3.0. The coverage ratio of boron on surfaces of the first particles and the second particles was 96%. The amount (molar fraction) of boron contained in the first particles and the second particles was measured by ICP. The amount (surface coverage ratio) of boron present on particle surfaces was measured by EPMA.

The composition of the composite oxide (II) as measured by ICP analysis was $Li_{1.01}Ni_{0.83}Co_{0.08}Mn_{0.07}B_{0.01}Ti_{0.02}O_2$. The D50 value of the composite oxide (II) was 11 μm. The average particle size of primary particles of the composite oxide (II) as determined through SEM observation of a cross section of the composite oxide (II) prepared by CP was 0.5 μm.

In Example 2, a non-aqueous electrolyte secondary battery was prepared in a similar manner to Example 1 except that a positive electrode active material prepared by mixing the composite oxide (I) obtained in Example 1 with the above-described composite oxide (II) in an amount of 50% by mass relative to the total mass of the positive electrode active material was used.

Example 3

A non-aqueous electrolyte secondary battery was prepared in a similar manner to Example 1 except that in the preparation of the composite oxide (I), an aluminum compound was used in place of a boron compound. The composition of the composite oxide (I) in Example 3 as measured by ICP analysis was $Li_{1.01}Ni_{0.81}Co_{0.10}Mn_{0.08}Al_{0.01}O_2$. The composite oxide (I) had, for example, a D50 value and an average particle size of primary particles that were similar to those in Example 1.

Example 4

A non-aqueous electrolyte secondary battery was prepared in a similar manner to Example 1 except that in the preparation of the positive electrode, the positive electrode active material obtained in Example 1, single-walled carbon nanotubes (SWCNT), multi-walled carbon nanotubes (MWCNT), and polyvinylidene fluoride (PVdF) were mixed in a solid content mass ratio of 98.76:0.2:0.04:1.0.

Example 5

A non-aqueous electrolyte secondary battery was prepared in a similar manner to Example 1 except that in the preparation of the positive electrode, the positive electrode active material obtained in Example 1, single-walled carbon nanotubes (SWCNT), and polyvinylidene fluoride (PVdF) were mixed in a solid content mass ratio of 98.96:0.04:1.0.

Example 6

A non-aqueous electrolyte secondary battery was prepared in a similar manner to Example 1 except that in the preparation of the positive electrode, the positive electrode active material obtained in Example 1, multi-walled carbon nanotubes (MWCNT), and polyvinylidene fluoride (PVdF) were mixed in a solid content mass ratio of 98.8:0.2:1.0.

Example 7

A non-aqueous electrolyte secondary battery was prepared in a similar manner to Example 1 except that in the preparation of the positive electrode, the positive electrode active material obtained in Example 1, single-walled carbon nanotubes (MWCNT), acetylene black (AB), and polyvinylidene fluoride (PVdF) were mixed in a solid content mass ratio of 98.76:0.04:0.2:1.0.

Example 8

A non-aqueous electrolyte secondary battery was prepared in a similar manner to Example 1 except that in the preparation of the composite oxide (II), a tantalum compound was used in place of a titanium compound. The composition of the composite oxide (II) in Example 8 as measured by ICP analysis was $Li_{1.01}Ni_{0.83}Co_{0.08}Mn_{0.07}B_{0.01}Ta_{0.01}O_2$. The composite oxide (II) had, for example, a D50 value and an average particle size of primary particles that were similar to those in Example 1.

Example 9

A non-aqueous electrolyte secondary battery was prepared in a similar manner to Example 1 except that in the preparation of the composite oxide (II), a tungsten compound was used in place of a titanium compound. The composition of the composite oxide (II) in Example 9 as measured by ICP analysis was $Li_{1.01}Ni_{0.83}Co_{0.08}Mn_{0.07}B_{0.010}W_{0.01}O_2$. The composite oxide (II) had, for example, a D50 value and an average particle size of primary particles that were similar to those in Example 1.

Example 10

A non-aqueous electrolyte secondary battery was prepared in a similar manner to Example 1 except that in the preparation of the composite oxide (I), a titanium compound was added together with a boron compound, and the materials were dry mixed in a 100:1:2 molar ratio of the total amount of Ni, Co, and Mn to B in the boron compound to Ti in the titanium compound to form composites with B and Ti on particle surfaces, and that in the preparation of the composite oxide (II), a titanium compound was not added. The composition of the composite oxide (I) in Example 10 as measured by ICP analysis was $Li_{1.01}Ni_{0.81}Co_{0.10}Mn_{0.8}B_{0.01}Ti_{0.02}O_2$. The composition of the composite oxide (II) in Example 10 as measured by ICP analysis was $Li_{1.01}Ni_{0.84}Co_{0.08}Mn_{0.07}B_{0.01}O_2$. The composite oxides (I) and (II) had, for example, D50 values and average particle sizes of primary particles that were similar to those in Example 1.

Example 11

A non-aqueous electrolyte secondary battery was prepared in a similar manner to Example 1 except that in the preparation of the composite oxide (I), a tantalum compound was added together with a boron compound, and the materials were dry mixed in a 100:1:2 molar ratio of the total amount of Ni, Co, and Mn to B in the boron compound to Ta in the tantalum compound to form composites with B and Ta on particle surfaces, and that in the preparation of the composite oxide (II), a titanium compound was not added. The composition of the composite oxide (I) in Example 11 as measured by ICP analysis was $Li_{1.01}Ni_{0.81}Co_{0.10}Mn_{0.08}B_{0.01}Ta_{0.02}O_2$. The composition of the composite oxide (II) in Example 11 as measured by ICP analysis was $Li_{1.01}Ni_{0.84}Co_{0.08}Mn_{0.07}B_{0.01}O_2$. The composite oxides (I) and (II) had, for example, D50 values and average particle sizes of primary particles that were similar to those in Example 1.

Example 12

A non-aqueous electrolyte secondary battery was prepared in a similar to Example 1 except that in the preparation of the composite oxide (I), a tungsten compound was added together with a boron compound, and the materials were dry mixed in a 100:1:2 molar ratio of the total amount of Ni, Co, and Mn to B in the boron compound to W in the tungsten compound to form composites with B and W on particle surfaces, and that in the preparation of the composite oxide (II), a titanium compound was not added. The composition of the composite oxide (I) in Example 12 as measured by ICP analysis was $Li_{1.01}Ni_{0.80}Co_{0.10}Mn_{0.08}B_{0.01}W_{0.02}O_2$. The composition of the composite oxide (II) in Example 12 as measured by ICP analysis was $Li_{1.01}Ni_{0.85}Co_{0.08}Mn_{0.07}B_{0.01}O_2$. The composite oxides (I) and (II) had, for example, D50 values and average particle sizes of primary particles that were similar to those in Example L.

Comparative Example 1

A non-aqueous electrolyte secondary battery was prepared in a similar manner to Example 1 except that in the preparation of the positive electrode, the positive electrode active material obtained in Example 1, acetylene black (AB), and polyvinylidene fluoride (PVdF) were mixed in a solid content mass ratio of 98.8:0.2:1.0.

Charge/Discharge Cycle Test

The batteries of the examples and the comparative example were charged at a constant current of 0.5 It under a temperature environment of 25° C. until the battery voltage reached 4.2 V, and were charged at a constant voltage of 4.2 V until the current value reached 1/50 It. The batteries were then discharged at a constant current of 0.5 It until the battery voltage reached 2.5 V. This charge/discharge cycle was repeated 150 times.

For the batteries of the examples and the comparative example, the discharge capacity in the first cycle and the discharge capacity in the $150^{th}$ cycle in the above-described cycle test were obtained, and the capacity retention rate was calculated by the following equation: Capacity retention rate (%)=($150^{th}$ cycle discharge capacity÷first cycle discharge capacity)×100. The results are given in Table 1.

Resistance Evaluation of Positive Electrode Mixture Layer

The resistance values of the positive electrode mixture layers prepared in the examples and the comparative example were measured using an electrode resistance measurement system, RM2610 manufactured by Hioki E.E. Corporation for the positive electrodes that were cut into pieces each having a 20 mm×20 mm shape with a tab. The results are given in Table 1.

lithium transition metal composite oxide (I) having a volume-based median diameter (D50) of 0.6 μm to 6 μm, wherein 50% or greater of all particles of the lithium transition metal composite oxide (I) are the (ii) particles substantially composed of single particles that are present independently of the secondary particles, and a lithium transition metal composite oxide (II) that comprises secondary particles that are aggregates of primary particles having an average particle size of less than 1 μm, the lithium transition metal composite oxide (II) having a volume-based median diameter (D50) of 3 μm to 25 μm wherein the lithium transition metal composite oxide (II) is a composite oxide represented by a general formula $Li_aNi_bCo_cM1_dM2_eO_f$ (where 0.8≤a≤1.2, b≥0.80, c≤0.15, 0.01≤d≤0.12, 0.001≤e≤0.06, 1≤f≤2, b+c+d+

TABLE 1

| | Composite oxide (I) | | | Composite oxide (II) | | | Amount of conductive material (% by mass) | | | Resistance of positive electrode mixture layer ($\Omega cm^2$) | Capacity retention rate after charge/discharge cycles (%) |
|---|---|---|---|---|---|---|---|---|---|---|---|
| | Elements present on particle surfaces | Average particle size of primary particles (μm) | D50 (μm) | Elements present on particle surfaces | Average particle size of primary particles (μm) | D50 (μm) | SWCNT | MWCNT | AB | | |
| Example 1 | B | 2 | 4 | Ti, B | 0.5 | 11 | 0.04 | 0.2 | 0 | 8.8 | 93.8 |
| Example 2 | B | 2 | 4 | Ti, B(D30 < D70) | 0.5 | 11 | 0.04 | 0.2 | 0 | 8.6 | 94.6 |
| Example 3 | Al | 2 | 4 | Ti, B | 0.5 | 11 | 0.04 | 0.2 | 0 | 9.0 | 94.2 |
| Example 4 | B | 2 | 4 | Ti, B | 0.5 | 11 | 0.2 | 0.04 | 0 | 2.4 | 78.6 |
| Example 5 | B | 2 | 4 | Ti, B | 0.5 | 11 | 0.04 | 0 | 0 | 17.1 | 86.4 |
| Example 6 | B | 2 | 4 | Ti, B | 0.5 | 11 | 0 | 0.2 | 0 | 17.4 | 84.3 |
| Example 7 | B | 2 | 4 | Ti, B | 0.5 | 11 | 0.04 | 0 | 0.2 | 12.3 | 87.5 |
| Example 8 | B | 2 | 4 | Ta, B | 0.5 | 11 | 0.04 | 0.2 | 0 | 8.5 | 91.8 |
| Example 9 | B | 2 | 4 | W, B | 0.5 | 11 | 0.04 | 0.2 | 0 | 9.2 | 91.7 |
| Example 10 | Ti, B | 2 | 4 | B | 0.5 | 11 | 0.04 | 0.2 | 0 | 7.9 | 93.9 |
| Example 11 | Ta, B | 2 | 4 | B | 0.5 | 11 | 0.04 | 0.2 | 0 | 7.7 | 92.4 |
| Example 12 | W, B | 3 | 4 | B | 0.5 | 11 | 0.04 | 0.2 | 0 | 8.2 | 93.1 |
| Comparative 1 | B | 2 | 4 | Ti, B | 0.5 | 11 | 0 | 0 | 0.2 | 31.3 | 69.9 |

As can be understood from Table 1, the batteries of the examples all exhibited higher capacity retention rates after the charge/discharge cycle test and achieved a reduced capacity drop associated with charge/discharge cycles compared to the battery of the comparative example. The positive electrode mixture layers of the examples all exhibited lower resistance values compared to the positive electrode mixture layer of the comparative example.

The invention claimed is:

1. A non-aqueous electrolyte secondary battery positive electrode, comprising:
    a positive electrode core; and
    a positive electrode mixture layer disposed on the positive electrode core,
    wherein the positive electrode mixture layer contains a positive electrode active material and carbon nanotubes, the positive electrode active material containing:
    a lithium transition metal composite oxide (I) that comprises a combination of (i) secondary particles that are aggregates of primary particles having an average particle size of 1 μm or greater, and (ii) particles substantially composed of single particles that are present independently of the secondary particles, the e=1, M1 represents one or more elements selected from Mn and Al, and M2 comprises B and Ti), wherein each of the lithium transition metal composite oxides (I) and (II) contains Ni in an amount of 80 mol % or more relative to the total number of moles of one or more metal elements excluding Li, and one or more elements selected from group 4 elements, group 5 elements, group 6 elements, and group 13 elements of the periodic table are present on particle surfaces of each of the lithium transition metal composite oxides (I) and (II).

2. The non-aqueous electrolyte secondary battery positive electrode according to claim 1, wherein the carbon nanotubes comprise both single-walled carbon nanotubes and multi-walled carbon nanotubes.

3. The non-aqueous electrolyte secondary battery positive electrode according to claim 1, wherein the percentage content of the lithium transition metal composite oxide (I) relative to the mass of the positive electrode active material is 20% by mass to 55% by mass.

4. The non-aqueous electrolyte secondary battery positive electrode according to claim 2, wherein the ratio of the mass of the single-walled carbon nanotubes to the mass of the positive electrode mixture layer is less than the ratio of the mass of the multi-walled carbon nanotubes to the mass of the positive electrode mixture layer.

5. The non-aqueous electrolyte secondary battery positive electrode according to claim 1, wherein the lithium transition metal composite oxide (I) is a composite oxide represented by a general formula $Li_aNi_bCo_cM1_dM2_eO_f$ (where $0.8 \leq a \leq 1.2$, $b \geq 0.80$, $c \leq 0.15$, $0.01 \leq d \leq 0.12$, $0.001 \leq e \leq 0.06$, $1 \leq f \leq 2$, $b+c+d+e=1$, M1 represents one or more elements selected from Mn and Al, and M2 represents one or more elements selected from group 4 elements, group 5 elements, group 6 elements, and group 13 elements of the periodic table).

6. The non-aqueous electrolyte secondary battery positive electrode according to claim 5, wherein in the lithium transition metal composite oxide (I), M2 in the general formula represents one or more elements selected from B and Al.

7. The non-aqueous electrolyte secondary battery positive electrode according to claim 5, wherein in the lithium transition metal composite oxide (I), M2 in the general formula represents B and Al.

8. The non-aqueous electrolyte secondary battery positive electrode according to claim 1, wherein the positive electrode mixture layer has a resistance of 15 $\Omega cm^2$ or less.

9. The non-aqueous electrolyte secondary battery positive electrode according to claim 5, wherein in the lithium transition metal composite oxide (II), M2 in the general formula comprises B, wherein, in the lithium transition metal composite oxide (II) particles having particle diameters that are larger than a volume-based 70% particle diameter (D70) are first particles, and that particles having particle diameters that are smaller than a volume-based 30% particle diameter (D30) are second particles, a molar fraction of B in the first particles (B1) relative to the total number of moles of one or more metal elements excluding Li is greater than a molar fraction of B in the second particles (B2) relative to the total number of moles of one or more metal elements excluding Li.

10. The non-aqueous electrolyte secondary battery positive electrode according to claim 1, wherein the positive electrode mixture layer is free of particulate conductive material.

11. A non-aqueous electrolyte secondary battery, comprising:
a positive electrode;
a negative electrode; and
a non-aqueous electrolyte,
wherein the positive electrode is the non-aqueous electrolyte secondary battery positive electrode according to claim 1.

* * * * *